3,202,521
CEMENT COMPOSITIONS AND THE METHOD OF
CONTROLLING THE AIR CONTENT THEREOF
Edwin N. Lorenzen, Denver, Colo., assignor to Protex Industries Inc., Denver, Colo., a corporation of Colorado
No Drawing. Filed Sept. 12, 1963, Ser. No. 308,356
10 Claims. (Cl. 106—90)

This invention relates to cement compositions or mixes containing air detraining agents and to a method for controlling the air content of such mixes and compositions.

As used in this specification and in the claims the term "cement mix" means any mixture of hydraulic cement with other materials and includes mortar and mixtures in all proportions of cement with water and aggregate, such as, sand and gravel. It also includes hardened or unhardened concrete mixtures. The term "hydraulic cement" means cement which hardens under water and includes Portland cement and other types of cement.

It is well known that the entrainment of certain amounts of air in cement and concrete mixes is advantageous for counteracting certain destructive effects on hardened concrete such as those resulting from extreme changes in temperature and from the use of de-icing compounds, such as, calcium chloride, sodium chloride and others. Conventional procedures for the manufacture of concrete and cement mixtures normally result in the entrainment of air into the mixtures. Air may also be intentionally entrained into cement mixes by the addition of suitable air entrainment agents. Sometimes air is unavoidably entrained into cement mixes by the addition of agents to produce certain effects other than air entrainment, such as, dispersion of the cement, acceleration of the hardening of the cement, improvement of workability, pozzuolanic effects and others, such agents in addition to producing the desired effect also having the property of entraining air.

It is well known that the amount of air entrained in cement mixes has a direct effect on the compressive and flexural strengths of the finished concrete. Accordingly, it is important to be able to control the amount of air entrained in cement mixes so that amounts in excess of that necessary to provide the beneficial effects desired are not present.

This becomes particularly important for the various applications of concrete, for example, concrete inside a building which is not subjected to extreme temperature changes so that excessive air entrainment is unnecessary to protect against the destructive effects of freezing and thawing. It is also important in controlling the amount of air introduced by use of an "air-entraining cement."

It is extremely difficult if not impossible to precisely control the amount of air entrained in a cement mix by controlling the amount of ingredients added as the amount of air added with the ingredients will vary with the type and size of aggregates, the mixing process used, atmospheric conditions during mixing, and others. It is particularly difficult to control the amount of air entrained when the so called "air entraining cements" are used. Therefore, it is highly important to have available a method for controlling the effective air content of cement mixes regardless of how the air is entrained.

Accordingly, it is an object of this invention to provide a method for the precise control of the effective air content of cement mixes.

It is another object of this invention to provide cement mixes containing air detraining agents which control the effective content of air in the mixes regardless of whether the air is entrained in normal manufacture of the mix or is incorporated by means of agents, such as, air-entraining agents and others.

It is still another object of this invention to provide an air-detraining agent for cement mixes which controls the effective air content of the mixes without detracting from the beneficial effect of other additives in the cement mixes.

It has been found that the above and other objects are accomplished by incorporating sodium dioctyl sulfosuccinate into cement mixes as an air-detraining agent, the amount used depending upon the required properties of the final mix and other factors. It has been found that use of this air-detraining agent in cement mixes within the specified range controls the effective air content of the mixes and, accordingly, the structural strength of the final mixes when set. The strength of the final mix is evidenced in concrete of all ages. The invention is particularly useful when applied to ordinary cement mixes for concrete, these mixes including hydraulic cement, aggregate and sufficient water to permit setting of the cement.

Sodium dioctyl sulfosuccinate has the following chemical formula:

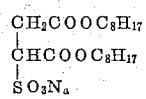

The explanation for its air-detraining effect is not known. It is not known whether the air-detraining effect of this agent is produced by reduction or prevention of the entrainment of air by some means, counteracting the effect of entrained air, or through some other phenomenon, but it is known that its presence is effective in controlling the effective air content of the mixes.

It has been found that sodium dioctyl sulfosuccinate can be used along with other agents for producing effects other than air-detraining effects without its presence detracting from the effects of these other agents. Examples of other agents with which it may be used are cement dispersing agents, such as, calcium lignosulphonate, hardening accelerators, such as, calcium chloride, air-entraining agents, agents to improve workability, provide pozzuolanic action, and others.

The sodium dioctyl sulfosuccinate air-detraining agent may be added in solid form or in solution. It may be mixed with components of the cement mixes and added with the components or it may be added to the completed mix. For example, it may be added to an air-entraining cement or to a solution of calcium lignosulphonate before these ingredients are added to the mix and incorporated with them into the mix.

The amount of the air-detraining agent used will depend somewhat upon the properties required of the final product and of the ingredients used. As little as .0005%, based on the weight of cement, is operative in decreasing air content of cement mixes and improving the properties of the final product. Use of the air-detraining agent in amounts up to 0.1% will generally decrease the air content of the mixes to insignificant amounts so that ordinarily the use of larger amounts has no additional effect and is unnecessary. The preferred range is from about .001% to about 0.1% based on the weight of cement in the mixes. However, with some mixes it may be desirable to use less than .001% while with other mixes it may be preferable to use amounts up to 0.3% provided the cost is not prohibitive.

The following examples the Tables I–V, inclusive, are submitted to illustrate the invetion but they are in no way limiting thereof.

The cement mixes used in the examples were made by conventional mixing techniques. The cement used in the examples was Portland cement. The composition of the mixtures for which results are reported in Tables I–IV, inclusive, is as follows:

| | Lbs. |
|---|---|
| Cement | [1] 470 |
| Water | 300 |
| Sand | 1380 |
| Coarse aggregage | 1850 |

[1] 5.0 sacks.

The above composition is merely representative of mix compositions in general comprising hydraulic cement aggregate and sufficient water for hydraulic setting of the cement, the invention being operative on any mix falling within this broad composition.

Unless otherwise stated in the tables, the percentages of sodium dioctyl sulfosuccinate and other additives used is based on the weight of cement. Slump tests for determining the slump values recorded in the tables were made by standard conventional methods. The air percentage values set forth in the tables are percentages by volume and were determined in accordance with ASTM C–231–62. The compression tests used to obtain the compressive strength data set forth in Tables I–IV, inclusive, were performed on 6" by 12" cylinders which were fabricated in accordance with ASTM C–192. After fabrication the cylinders were cured in saturated air at 73° F. ±3° F. and tested in compression at standard ages of 1, 7 and 28 days.

Compressive strength is usually a direct function of the water-cement ratio, the strength varying inversely with the amount of water. High air content will also result in a reduction in strength.

The ratio of water to cement shown in the table is based on gallons of water per sack of cement, a sack of cement weighing 94 pounds net. An air-entraining cement as used in the examples of Tables I, II and V is a cement which has a compound which causes air entrainment in the concrete mixture incorporated into the cement during its manufacture. A non-air entraining cement as used in the examples of Tables III and IV does not contain such an agent and ordinarily no air will be entrained into concrete formed from this type cement. The calcium lignosulfonate used in the examples of Tables II and III is an agent used to reduce the amount of water in a concrete mix to provide a given degree of plasticity. These sulfonates also act as air entraining agents in varying degree and their use is often attended by excessive air entrainment. Neutralized "Vinsol" resin as used in the examples in Table IV is a sodium soap of wood resins neutralized by the addition of small amounts of sodium hydroxide and it functions as an air entraining agent.

The composition of the mortar used in the examples of Table V consisted of approximately 350 grams of cement and 1400 grams of standard sand plus water to provide a flow of 95% as measured in accordance with test method ASTM C–185.

TABLE I (AIR ENTRAINING CEMENT)

| Mix No. | Sodium Dioctyl Sulfosuccinate, Percent | Other Additive, Percent | Slump Value (Inches) | Water/Cement Ratio | Air (Percent) | Concrete Compressive Strength (p.s.i.) | | |
|---|---|---|---|---|---|---|---|---|
| | | | | | | 1 day | 7 days | 28 days |
| 1 | None | None | 3.5–4 | 8.20 | 7.4 | 850 | 2,660 | 3,340 |
| 2 | 0.005 | | | 8.47 | 6.0 | 930 | 2,775 | 3,470 |

TABLE II (AIR ENTRAINING CEMENT)

| Mix No. | Sodium Dioctyl Sulfosuccinate, Percent | Other Additive, Percent | Slump Value (Inches) | Water/Cement Ratio | Air (Percent) | Concrete Compressive Strength (p.s.i.) | | |
|---|---|---|---|---|---|---|---|---|
| | | | | | | 1 day | 7 days | 28 days |
| 1 | None | None | 3.5–4 | 8.20 | 7.4 | 850 | 2,660 | 3,340 |
| 2 | | [1] 0.27 | | 7.00 | 10.1 | 730 | 2,400 | 3,200 |
| 3 | .0025 | | | 7.40 | 6.3 | 900 | 3,280 | 4,270 |
| 4 | 0.01 | | | 7.80 | 4.4 | 890 | 3,110 | 4,150 |

[1] Calcium Lignosulfonate.

TABLE III (NON-AIR ENTRAINING CEMENT)

| Mix No. | Sodium Dioctyl Sulfosuccinate, Percent | Other Additive, Percent | Slump Value (Inches) | Water/Cement Ratio | Air (Percent) | Concrete Compressive Strength (p.s.i.) | | |
|---|---|---|---|---|---|---|---|---|
| | | | | | | 1 day | 7 days | 28 days |
| 1 | None | [1] 0.27 | 5.5–6 | 7.0 | 10.4 | 500 | 3,000 | 3,850 |
| 2 | .0025 | | | 7.7 | 3.2 | 650 | 3,500 | 4,430 |

[1] Calcium Lignosulfonate.

TABLE IV (NON-AIR ENTRAINING CEMENT)

| Mix No. | Sodium Dioctyl Sulfosuccinate, Percent | Other Additive, Percent | Slump Value (Inches) | Water/Cement Ratio | Air (Percent) | Concrete Compressive Strength (p.s.i.) | | |
|---|---|---|---|---|---|---|---|---|
| | | | | | | 1 day | 7 days | 28 days |
| 1 | None | [1] 14 | 3.5–4 | 8.30 | 6.2 | 600 | 2,360 | 3,600 |
| 2 | 0.0025 | | | 8.30 | 4.6 | 640 | 2,600 | 3,755 |

[1] Vinsol Resin Solution, 1 ounce/sack of cement.

Table V

[Mortar made with air-entraining cement]

| Mix No. | Sodium dioctyl sulfo- succinate, percent | Flow (percent) | Total Water Content (ml.) | Air, percent |
| --- | --- | --- | --- | --- |
| 1 | None | 95 | 250 | 15.6 |
| 2 | 0.01 | 95 | 270 | 10.5 |

It is seen from the comparative examples presented in Table I that the addition 0.005% of sodium dioctyl sulfosuccinate resulted in a reduction of entrained air in the mix from 7.4% to 6.0% without materially affecting the amount of water required. Its presence substantially increased the compressive strength of the concrete for each of the aging periods shown in the table.

Comparison of mixes 1 and 2 of Table II shows that the addition of calcium lignosulfonate caused excessive entrainment of air, thereby appreciably reducing the strength of the concrete, in spite of the fact that its presence reduced the water-cement ratio. The results obtained on mixes 3 and 4 of this table show that the addition of varying amounts of sodium dioctyl sulfosuccinate to mixes containing the cement dispersing agent, calcium lignosulfonate, prevented the excessive entrainment of air ordinarily obtained with this cement dispersing agent and substantially increased the compressive strength of the concrete at all ages despite the presence of calcium lignosulfonate. The water-cement ratio for mixes 2, 3 and 4 was less than that for control mix No. 1. The concretes retained excellent durability inherent in concretes in which a moderate amount of air is entrained, thus demonstrating that the beneficial effects of calcium lignosulfonate were retained while its disadvantageous excessive air entraining properties were nullified.

With reference to Table III, it will be seen that results obtained with a non-air entraining cement are comparable with those obtained with an air entraining cement as in the examples of Table II. For example, the comparative results of mixes 1 and 2 of Table III show that the presence of sodium dioctyl sulfosuccinate reduced air entrainment 7.2% and, even though the water-cement ratio was somewhat increased, compressive strengths were also increased at all ages by the presence of sodium dioctyl sulfosuccinate, the concretes retaining durability advantages inherent in concrete in which a moderate amount of air is entrained.

The comparative results of the examples set forth in Table IV show that the addition of 0.0025% of sodium dioctyl sulfosuccinate to a non-air entraining cement to which has been added the air entrainment agent, "Vinsol" resin, reduced air entrainment 1.6% without affecting the amount of water required, and the presence of sodium dioctyl sulfosuccinate substantially increased the compressive strength of the concrete at all ages. The results of Table II, III and IV illustrate that sodium dioctyl sulfosuccinate is highly effective for controlling air entrainment and compressive strength of formed concrete in the presence of air entraining agents or agents which are added for other purposes but additionally entrain air. The presence of sodium dioctyl sulfosuccinate does not detract from the beneficial effects of these latter agents.

The examples set forth in Table V illustrate the effect of the presence of sodium dioctyl sulfosuccinate in mortar. The comparative results show that the addition of 0.01% of sodium dioctyl sulfosuccinate to a mortar mix reduced air-entrainment from 15.6 to 10.5% a reduction of approximately 33.0%.

The above results graphically illustrate the effectiveness of sodium dioctyl sulfosuccinate as an air-detraining agent for controlling the percentage of air in cement mixes. While a percentage range of the amount of sodium dioctyl sulfosuccinate present in the concrete from .0025 to .01 based on the weight of cement in the mix is disclosed in the examples, the preferred range has been found to be from about .001 to about 0.1% of the air-detraining agent in the concrete mix based on the weight of cement. The amounts used within this percentage range will depend upon the composition of the cement mix including the presence and amounts of other additives, such as air-entraining agents, and the properties desired in the finished product.

It is seen from the above description of the invention and the supporting illustrative examples, that improved cement mixes and a method for making them has been provided. While the invention has been illustrated in some of the examples by the use of sodium dioctyl sulfosuccinate in conjunction with the air-entraining agent "Vinsol" resin and the cement dispersing agent, calcium lignosulfonate, it is not limited to the use of sodium dioctyl sulfosuccinate with these specific agents, but the air-detraining agent may be used in combination with other equivalent agents.

The invention furnishes a convenient method for adjusting the compressive strength of finished concrete and for obtaining concrete within desirable compressive strength ranges. It provides a method by which the advantageous effects of certain agents, such as, cement dispersing agents and others may be obtained due to their presence in cement mixes, while at the same time nullifying the disadvantageous air-entraining effect of these agents by the simultaneous addition to the cement mixes the air-detraining agent of this invention. The method presents no difficulties in incorporating the air-detraining agent in the concrete mixes.

Although the invention has been illustrated and described with reference to the preferred embodiments thereof, it is to be understood that it is in no way limited to the details of such embodiments, but is capable of numerous modifications within the scope of the appended claims.

What is claimed is:

1. The method of controlling the effective air content of a hydraulic cement mix containing sufficient water for hydraulic setting of the cement which consists essentially of incorporating into the mix up to about 0.3 percent of sodium dioctyl sulfosuccinate based on the weight of cement present in the mix.

2. The method of claim 1 in which sodium dioctyl sulfosuccinate is incorporated into the mix in an amount between about .001 and 0.1 percent based on weight of cement in the mix.

3. A hydraulic cement mix consisting essentially of hydraulic cement, aggregate, at least enough water to provide for hydraulic setting of the cement and, as an air-detraining agent, up to about 0.3 percent of sodium dioctyl sulfosuccinate based on the weight of cement present in the mix.

4. The mix of claim 3 in which sodium dioctyl sulfosuccinate is present in an amount from about .001 to about 0.1 percent based on weight of cement present in the mix.

5. The mix of claim 4 in which sodium dioctyl sulfosuccinate is present in an amount from about .0025 to about .01 percent based on the weight of cement present in the mix.

6. The cement mix of claim 3 to which is added up to about 0.3 percent of calcium lignosulfonate based on the weight of cement present.

7. The cement mix of claim 3 in which the cement is Portland cement and the sodium dioctyl sulfosuccinate is added in an amount from about .001 to about 0.3 percent based on the weight of cement present in the mix.

8. The method of controlling the effective air content of a hydraulic cement mix consisting essentially of hydraulic cement, aggregate and at least enough water to provide for hydraulic setting of the cement, which consists essentially of incorporating into the mix up to 0.3 percent of sodium dioctyl sulfosuccinate based on the weight of cement in the mix.

9. The method of claim 8 in which sodium dioctyl sulfosuccinate is incorporated into the mix in an amount between about .001 and 0.1 percent based on the weight of the cement in the mix.

10. The method of controlling the effective air content of a Portland cement mix containing sufficient water for hydraulic setting of the cement which consists essentially of incorporating into the mix from about .001 to about 0.3 percent of sodium dioctyl sulfosuccinate based on the weight of cement present in the mix.

References Cited by the Examiner
UNITED STATES PATENTS

| | | | |
|---|---|---|---|
| 2,028,091 | 1/36 | Jaeger | 260—481 |
| 2,702,818 | 2/55 | Jaquay | 260—481 |
| 2,776,902 | 1/57 | Scripture | 106—90 |
| 2,790,724 | 4/57 | Bergman | 106—90 |
| 2,798,003 | 7/57 | Morgan et al. | 106—90 |

OTHER REFERENCES

Aerosal Wetting Agents, trade catalog of Specialty Products Dept., Industrial Chemicals Division, American Cyanamid Co., 1946, New York, pages 3, 44, 45.

TOBIAS E. LEVOW, *Primary Examiner.*